United States Patent [19]

Deschamps et al.

[11] 4,220,634

[45] Sep. 2, 1980

[54] PROCESS FOR CONVERTING AMMONIUM IMIDODISULFATE, AMMONIUM SULFAMATE AND AMMONIUM DITHIONATE TO SULFUR DIOXIDE AND AMMONIA

[75] Inventors: André Deschamps, Noisy le Roi; Claude Dezael, Maisons Laffitte; Sigismond Franckowiak, Rueil Malmaison; Henri Gruhier, Chatillon, all of France

[73] Assignee: Institut Francais du Petrole, Rueil Malmaison, France

[21] Appl. No.: 2,273

[22] Filed: Jan. 10, 1979

[30] Foreign Application Priority Data

Jan. 10, 1978 [FR] France .................... 78 00758
Apr. 27, 1978 [FR] France .................... 78 12882

[51] Int. Cl.² ............................................. C01C 1/02
[52] U.S. Cl. .................................. 423/356; 423/235; 423/539
[58] Field of Search ............... 423/356, 539, 541 A, 423/388, 389, 235

[56] References Cited

U.S. PATENT DOCUMENTS

| 3,661,516 | 5/1972 | Hofmeister | 423/388 |
| 3,810,968 | 5/1974 | Renault et al. | 423/541 A |
| 3,833,715 | 9/1974 | Deschamps et al. | 423/356 |
| 4,029,745 | 6/1977 | Dezael et al. | 423/356 |
| 4,055,623 | 10/1977 | Saitoh | 423/388 |
| 4,081,442 | 3/1978 | Wassen et al. | 423/356 |

FOREIGN PATENT DOCUMENTS

| 696996 | 4/1952 | United Kingdom | 423/388 |
| 1004524 | 8/1962 | United Kingdom | 423/541 A |

Primary Examiner—O. R. Vertiz
Assistant Examiner—Thomas W. Roy
Attorney, Agent, or Firm—Millen & White

[57] ABSTRACT

Ammonium imidodisulfate and ammonium sulfamate may be converted to sulfur dioxide and ammonia by heating them with a reducing agent or a catalyst in a bath of molten ammonium sulfate and ammonium bisulfate. The reducing agent is sulfur or a sulfur compound and the catalyst is selected from Mo, W, Cu, Fe, Co, Cr, Mn and Ni.

8 Claims, No Drawings

PROCESS FOR CONVERTING AMMONIUM IMIDODISULFATE, AMMONIUM SULFAMATE AND AMMONIUM DITHIONATE TO SULFUR DIOXIDE AND AMMONIA

The invention concerns a process for converting ammonium imidodisulfate (IMDS) and/or ammonium sulfamate (SMA), in the optional presence of ammonium dithionate (DTN), to sulfur dioxide and ammonia.

These salts are recovered, for example, from the simultaneous absorption of nitrogen oxides and sulfur dioxide present in combustion gas, with aqueous solutions comprising ammonium sulfite and an iron chelate, for example the iron chelate of ethylenediaminotetracetic acid. These salts have no important use and their discharge represents an important loss of reactants and creates a pollution problem.

It has been already proposed to convert these salts to ammonium sulfate by oxidation and hydrolysis, but the latter material has no substantial market.

It would be more beneficial to recover ammonia from these salts and to recycle it to the step of $SO_2$ and nitrogen oxide absorption.

It has been found that these salts can be converted to a gas mixture comprising $SO_2$ and $NH_3$ by contacting them with a molten mixture of ammonium bisulfate and sulfate.

The $SO_2$ and $NH_3$ containing gas mixture may be treated thereafter by any known means to recover, separately or in admixture, the constituents in the form of $NH_3$, $SO_2$ or sulfur.

The process comprises contacting at least one of these salts with molten ammonium sulfate and/or bisulfate, at a temperature of 280° to 420° C., in the presence of a sulfur-containing reducing agent, such as sulfur, hydrogen sulfide, ammonium thiosulfate and/or ammonium polysulfide, and/or a catalyst comprising Mo, W, Cu, Fe, Co, Cr, Mn and/or Ni.

In the selected temperature range, equilibrium between ammonium sulfate and ammonium bisulfate occurs. It is thus possible, without disadvantage, to prepare the bath from ammonium sulfate, ammonium bisulfate or a mixture of both.

In the presence of the above reducing agents, the decomposition of the above salts takes place mainly according to the following reactions:

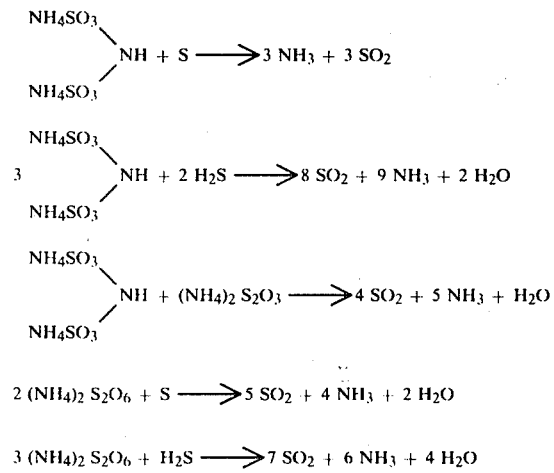

$$2 (NH_4)_2 S_2O_6 + (NH_4)_2 S_2O_3 \longrightarrow 6 SO_2 + 6 NH_3 + 3 H_2O$$

$$2 NH_2 SO_3 NH_4 + S \longrightarrow 3 SO_2 + 4 NH_3$$

$$3 NH_2 SO_3 NH_4 + H_2S \longrightarrow 4 SO_2 + 6 NH_3 + H_2O$$

$$2 NH_2 SO_3 NH_4 + (NH_4)_2 S_2O_3 \longrightarrow 4 SO_2 + 6 NH_3 + H_2O$$

It is easy to deduce the stoichiometrical proportion from the above relations, when using an ammonium polysulfide.

It has thus been found that sulfur and nitrogen of these salts are converted respectively to $SO_2$ and $NH_3$.

When the ammonium sulfate/bisulfate bath contains a Mo, W, Cu, Fe, Co, Cr, Mn and/or Ni salt, in the absence of reducing agents, the salt decomposition takes place essentially according to the reactions:

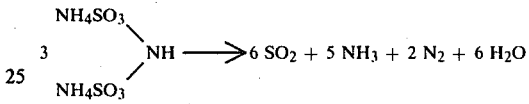

$$3 (NH_4)_2 S_2O_6 \longrightarrow 6 SO_2 + 4 NH_3 + N_2 + 6 H_2O$$

$$3 NH_2 SO_3 NH_4 \longrightarrow 3 SO_2 + 4 NH_3 + N_2 + 3 H_2O$$

It is easy to deduce the stoichiometrical proportion from the above relations, when operating with an ammonium polysulfide.

In that case, nitrogen of the salts is converted to molecular nitrogen and ammonia, while sulfur is converted to $SO_2$.

When operating in the simultaneous presence of a reducing agent and a catalyst, the salt decomposition takes place according to several of the above reactions in variable proportions depending on the temperature. As a rule, the reactions of reduction with S, $H_2S$ and $(NH_4)_2 S_2O_3$ are preponderant at the lower temperatures, about 280° to 350° C., while the decomposition reactions prevail at temperatures above 350° C. It has also been found that the above catalysts substantially increase the reduction rate, particularly when the reduction agent is $H_2S$.

The process of the invention may be operated at a temperature of from 280° to 420° C., preferably 300° to 380° C. When operating only with a catalyst, it is desirable to proceed in the temperature range of from 350° to 380° C., thereby obtaining high reaction rates. At temperatures lower than 280° C., the reaction rates are low and ammonia is retained in the bath of molten salt by ammonium bisulfate which is converted to ammonium sulfate, which may result in the solidification of the bath. At temperatures above 420° C., ammonium bisulfate decomposes at a too high rate, so that the bath volatilizes.

The process is usually operated at a pressure close to atmospheric pressure. A higher pressure may be used, if necessary; however too high pressures may inhibit the ammonia release and result in solidification of the bath. The useful pressure range is from 0.5 to 10 atm., preferably 1 to 5 atm.

The process is usually operated by injecting the salts, either individually or in admixture, as such or in aqueous solution, into a reactor containing an ammonium sulfate/bisulfate bath at a temperature of 280° to 420° C.

The charge of salts may also comprise, without disadvantage, other ammonium salts, such as ammonium sulfites and sulfates. By adjusting the operating conditions, they are also decomposed to $SO_2$ and $NH_3$.

When using a catalyst, the latter may be introduced into the bath as powdered metal, oxide, sulfide or salt such as, for example, Mo, W, Cu, Fe, Co, Cr, Mn and/or Ni sulfate, nitrate or acetate, in a preferred proportion of 0.1 to 10% b.w. of metal. Continuous supply of catalyst is not necessary.

When operating without catalyst, the reducing agent is supplied continuously or by fractions in admixture with the feed charge or separately in at least stoichiometrical reaction proportions. When using both a reducing agent and a catalyst, the proportion of reducing agent may be reduced, if desired.

Temporary accumulation of the salts to be decomposed, in the ammonium sulfate/bisulfate bath, due for example to a temperature decrease or a too low proportion of reducing agent, does not alter the overall running of the plant. It results in an increase of the bath volume, which can be brought back to its normal value by adjusting the operating conditions. The temporary use of an excess of reducing agent or a too high temperature may result in a decrease of the bath volume due to ammonium sulfate decomposition. The normal volume of the bath may be attained by decreasing the temperature and/or the feed rate of the reducing agent.

The gas discharged from the reactor comprises $SO_2$ and $NH_3$, possibly also $H_2O$ and/or $N_2$ and, from time to time, low amounts of $H_2S$ and S from the unconverted reducing agents. When the reactor is heated by direct contact of the salt bath with hot gas from a burner, the latter gas is also present in the effluent gas.

The gas mixture may be treated thereafter by any known method to recover, preferably separately, $NH_3$ and a valuable sulfur compound such as $So_2$, $H_2SO_4$ or even sulfur. Reference is made to the process of the French Pat. No. 2,199,475 according to which the $SO_2$ and $NH_3$ containing gas mixture is admixed with a $H_2$ and/or CO containing reducing gas and contacted first with a solid catalyst, so as to convert a portion of $SO_2$ to $H_2S$, and then a selective solvent to convert therein $H_2S$ and $SO_2$ to elemental sulfur. Ammonia may be recovered thereafter.

The following, non limitative examples, illustrate the invention:

EXAMPLE 1

400 g of ammonium hydrogen sulfate are introduced into an electrically heated quartz reactor which is thereafter heated to 350° C. 50 cc/hour of an aqueous solution of 1 mole/liter ammonium imidodisulfate and 2 moles/liter ammonium dithionate is pumped into the bath of molten material. 7 g/hour of liquid sulfur is also pumped into the bath. Stirring of the bath is obtained by bubbling therethrough 100 liters of nitrogen per hour and the temperature is maintained at 350° C.

Ammonia is analysed in the effluent gas from the reactor by absorption in a sulfuric acid solution which is thereafter analysed back with a titrated sodium hydroxide solution. $So_2$ is analysed by absorption in a sodium hydroxide solution which is titrated with iodine.

The analysis of the gas gives the following results with respect to time.

TABLE I

| Time in hours | $SO_2$ flow rate moles/hour | $NH_3$ flow rate moles/hour |
|---|---|---|
| 1 | 0.385 | 0.330 |
| 2 | 0.410 | 0.355 |
| 4 | 0.390 | 0.352 |

The theoretical flow rates of $SO_2$ and $NH_3$ corresponding to the sulfur reduction of ammonium imidodisulfate and dithionate are respectively 0.4 and 0.35 mole/hour.

The level of the ammonium sulfate bath does not vary in the course of time and the analysis of the bath at the end of the experiment shows that no accumulation of IMDS and DTN has taken place.

It is thus found that the decomposition of IMDS and DTN to $SO_2$ and $NH_3$ is practically quantitative.

EXAMPLE 2

Example 1 is repeated, except that sulfur is replaced with other reducing agents or a catalyst is introduced into the sulfate bath. The following table summarizes the operating conditions and the average $SO_2$ and $NH_3$ hourly feed rates, as determined in the effluent gas for 4 hour-experiments. The theoretical rates, also stated, relate to the reduction of the salts, when using reducing agents, or to their decomposition, when using a catalyst (according to the above stated reactions).

The results of experiments 1 to 3 show that, in the selected operating conditions, the imidodisulfate and the dithionate are effectively reduced by the reducing compounds: S, $(NH_4)_2 S_2O_3$ and $H_2S$.

The results of experiments 4 to 7 relate to the embodiment of the process which is operated in the presence of a catalyst and without reducing agent. They show that the quantitative decomposition of ammonium imidodisulfate and dithionate may be obtained without decomposing the ammonium sulfate of the bath by judiciously selecting the operating temperature.

The results of experiments 8 to 10 show that the simultaneous use of a catalyst (Cu) and a reducing agent ($H_2S$) increases the imidodisulfate reduction rate and results in partial reduction of the ammonium bisulfate of the bath. A reduction of the $H_2S$ feed rate suppresses the parasitic reduction of ammonium bisulfate, while maintaining the quantitative reduction of imidodisulfate.

TABLE II

| Experiment No. | Salt Injection (moles/h) | | Reducing Agent | | Catalyst | T bath °C. | $SO_2$ Feed Rate moles/h | | $NH_3$ Feed Rate moles/h | | Remarks |
|---|---|---|---|---|---|---|---|---|---|---|---|
| | Ammonium imidodisulfate | Ammonium dithionate | | | | | Theoretical | Measured | Theoretical | Measured | |
| 1 | 0.05 | 0.1 | Sulfur | 7 g/h | None | 350 | 0.4 | 0.395 | 0.35 | 0.345 | The effluent contains sulfur. |
| 2 | 0.05 | 0.1 | $(NH_4)_2 S_2O_3$ | 25 g/h | None | 350 | 0.569[1] | 0.585 | 0.688[1] | 0.680 | The effluent contains sulfur. |